United States Patent
Vulcano

(10) Patent No.: US 9,897,507 B2
(45) Date of Patent: Feb. 20, 2018

(54) AUTOMATED WORK PIECE CENTER OF MASS IDENTIFICATION SYSTEM AND METHOD FOR SAME

(71) Applicant: Raytheon Company, Waltham, MA (US)

(72) Inventor: Anthony R. Vulcano, Vail, AZ (US)

(73) Assignee: Raytheon Company, Waltham, MA (US)

( * ) Notice: Subject to any disclaimer, the term of this patent is extended or adjusted under 35 U.S.C. 154(b) by 300 days.

(21) Appl. No.: 14/689,125

(22) Filed: Apr. 17, 2015

(65) Prior Publication Data

US 2016/0305842 A1 Oct. 20, 2016

(51) Int. Cl.
 G01M 1/00 (2006.01)
 G01M 1/12 (2006.01)
 B25J 11/00 (2006.01)
 B25J 13/08 (2006.01)

(52) U.S. Cl.
 CPC .............. *G01M 1/122* (2013.01); *B25J 11/00* (2013.01); *B25J 13/085* (2013.01); *Y10S 901/44* (2013.01)

(58) Field of Classification Search
 None
 See application file for complete search history.

(56) References Cited

U.S. PATENT DOCUMENTS

| 3,992,933 A | 11/1976 | Randolph, Jr. |
| 4,161,876 A | 7/1979 | Carpenter |
| 4,213,330 A | 7/1980 | Brozel et al. |
| 5,081,865 A | 1/1992 | Schechter et al. |
| 8,594,847 B2 * | 11/2013 | Schreiber .............. B25J 13/085 700/258 |
| 8,874,357 B2 | 10/2014 | Wolfram et al. |
| 9,186,795 B1 * | 11/2015 | Edsinger ................ B25J 9/1694 |
| 9,272,743 B2 * | 3/2016 | Thielman ............. G05D 1/0891 |
| 2009/0249750 A1 | 10/2009 | Black et al. |
| 2012/0324991 A1 | 12/2012 | Goertz et al. |
| 2013/0197792 A1 | 8/2013 | Wolfram et al. |
| 2015/0328771 A1 * | 11/2015 | Yuelai .................... B25J 9/1612 414/730 |

OTHER PUBLICATIONS

"International Application Serial No. PCT/US2017/056988, International Search Report dated Dec. 28, 2017", 2 pgs.
"International Application Serial No. PCT/US2017/056988, Written Opinion dated Dec. 28, 2017", 10 pgs.

* cited by examiner

*Primary Examiner* — Peter Macchiarolo
*Assistant Examiner* — Jermaine Jenkins
(74) *Attorney, Agent, or Firm* — Schwegman Lundberg & Woessner, P.A.

(57) ABSTRACT

A method and system for identifying a work piece center of mass includes coupling a work piece to a manipulator assembly. The manipulator assembly includes a force and torque sensor. The work piece is positioned in at least two different orientations relative to a gravity vector with the manipulator assembly. The at least two different orientations include at least first and second orientations. In the first orientation the force and torque sensor measures a first torque and at least a first force associated with the work piece in the first orientation. In the second orientation the force and torque sensor measures a second torque associated with the work piece in the second orientation. The work piece center of mass is identified according to at least the measured first and second torques and at least the first force.

27 Claims, 8 Drawing Sheets

AUTOMATED WORK PIECE CENTER OF MASS IDENTIFICATION SYSTEM AND METHOD FOR SAME

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raytheon Company, Waltham, Mass. All Rights Reserved.

TECHNICAL FIELD

This document pertains generally, but not by way of limitation, to the determination of the center of mass including center of gravity for a work piece.

BACKGROUND

Determining the center of mass of the discrete parts of an overall assembly (a work piece) is relatively straightforward with center of mass calculations including knowledge of the dimensions of the part (e.g., shape and size) and its mass. Determination of the center of mass is much more complex when parts are incorporated as a whole into an overall assembly. The overall assembly has a variety of parts, in varying orientations, constructed with different materials that are coupled together. The assembly is difficult to model because of the various orientations of the parts and the varying materials. The determination of center of mass for the assembly is critical for the control of assemblies including launch vehicles and payloads (satellites and the like). For instance, the center of mass is accurately identified to ensure precise control including, but not limited to, control of pitch, yaw, roll and the like during launch, delivery and operation of a payload.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
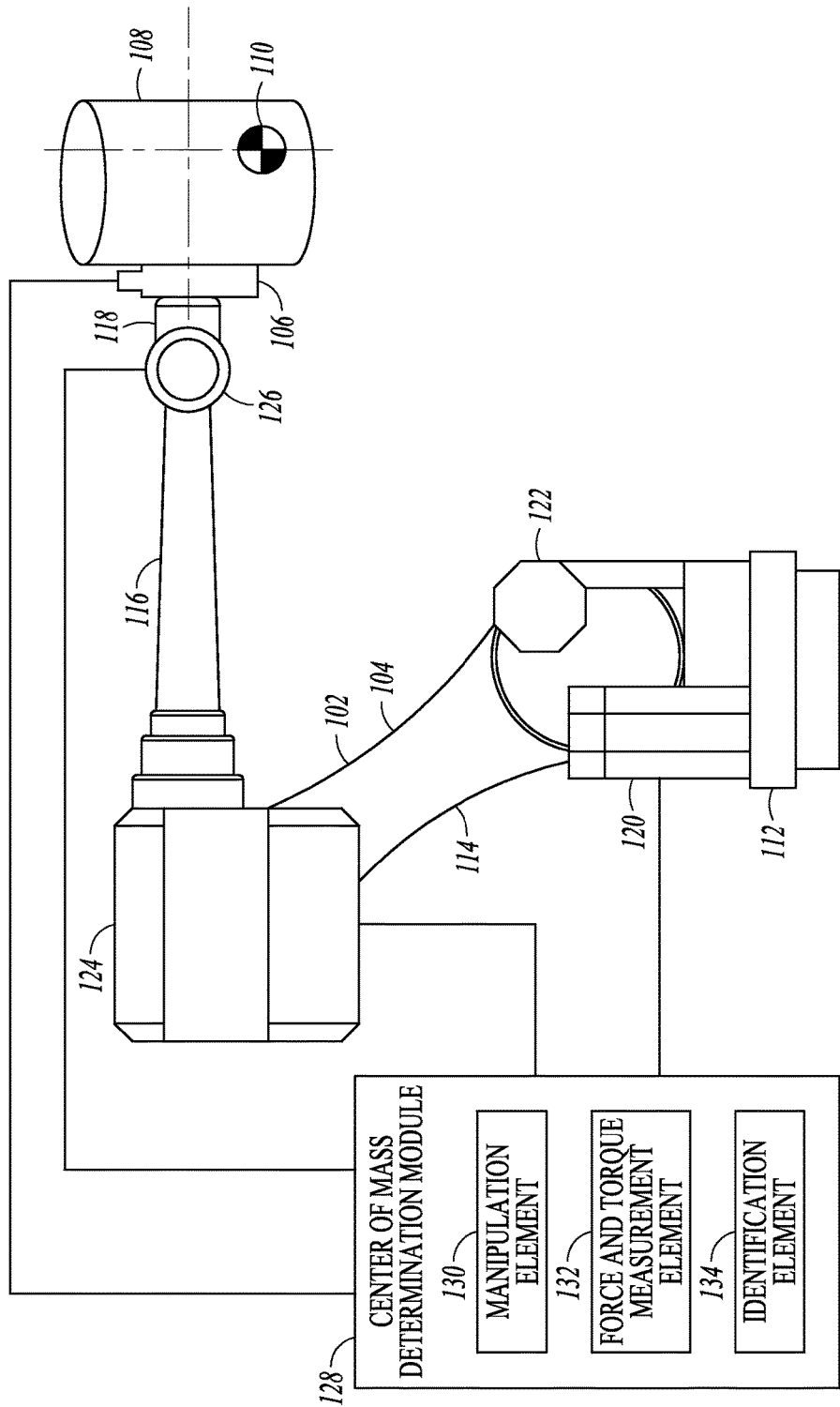
FIG. 1 is a schematic view showing one example of a system for manipulating a work piece and determining the center of mass of the work piece.

Load tables are used to measure center of mass with assemblies having multiple component parts assembled together. The assembly is brought to a facility having a load table of sufficient size and capacity to carry the assembly (e.g., in some example configured to weigh thousands of pounds). The assembly is fixed to the table (e.g., bolted) to ensure the assembly remains in a particular orientation. Load cells measure the weight of the assembly. For instance, the loads cells are spaced around the load table and measure portions of the assembly weight incident on the respective load cells. The measurements are used in combination with the relative location of the load cells to determine the assembly center of mass in two dimensions forming a plane parallel to the load table (e.g., X/Y, Y/Z or X/Z). The assembly is then unbolted from the load table, reoriented relative to the first orientation to move the first plane, such as the X/Y plane, out of alignment to the load table. In this second orientation weight measurements are taken again and a second assembly center of mass is determined in the updated dimensions (e.g., Y/Z if the first plane was X/Y).

After the measurements are taken the assembly is unbolted from the load table and returned for further production, testing or the like. The measurement of the center of mass in each of the two orientations is combined to identify the coordinates of the assembly center of mass.

The present inventors have recognized, among other things, that a problem to be solved can include decreasing time and labor needed to identify the center of mass of a work piece. Identification of the center of mass with load tables involves a relatively complex testing setup with a dedicated load table including an array of load cells. Additionally, the work piece (sometimes weighing hundreds or thousands of pounds) is reoriented to ensure measurement of the center of mass in at least two orientations. Accordingly, in some examples, identifying the center of mass may take a half to full day to bolt the work piece to the table, take the necessary measurements, unbolt the work piece, and then reorient the work piece to take additional measurements. Removal of the work piece from production to identify the center of mass extends overall production time and requires significant additional labor.

In an example, the present subject matter can provide a solution to this problem, such as by automatically identifying a work piece center of mass through a manipulator assembly configured to measure force and torque of the work piece. The manipulator assembly orients the work piece in at least two different orientations relative to a reference force (e.g., gravity in one example) and measures force and torque incident on a force and torque sensor in each of the orientations. The force and torque measurements in each of the at least two orientations are used to identify the center of mass of the work piece. The coupling of the work piece to the manipulation assembly, manipulation into at least two orientations, measurements and identification of the center of mass are conducted in a rapid and accurate fashion (e.g., in a minute or less).

In one example, the manipulator assembly includes a manipulator arm configured to reorient the work piece in the at least two different orientations. The manipulator arm includes the force and torque sensor, and the force and torque sensor measures forces and torques for the work piece transmitted between the work piece and the manipulator arm (e.g., weight, moment of the work piece relative to the arm or the like). Optionally, the force and torque sensor are included in an effector assembly. The effector assembly is grasped by the manipulator arm and the manipulator arm operates the effector assembly to couple with the work piece, for instance with manipulator and work piece interfaces, respectively.

In another example, the identification of a work piece center of mass as described herein is conducted in a rapid fashion. Optionally, the center of mass identification is conducted as the work piece is moved between pieces of equipment or stations in a production or testing line. That is to say, as the manipulator assembly moves the work piece between pieces of equipment or stations the manipulator assembly orients the work piece and the sensors measure forces and torque. Accordingly, the method, systems and devices described herein are readily incorporated in an existing or new production or testing line. Removal of the work piece from a line (perhaps for a day or longer) for center of mass identification is thereby avoided.

This overview is intended to provide an overview of subject matter of the present patent application. It is not intended to provide an exclusive or exhaustive explanation of the invention. The detailed description is included to provide further information about the present patent application.

FIG. 1 shows one example of a center determination system 100. As described herein the center determination system 100 is configured to measure and identify the location of a center of mass (including the center of mass and center of gravity) of a work piece, such as the work piece 108 coupled with the center determination system 100. As shown, the center determination system 100 includes a manipulator assembly 102 and a force and torque sensor associated with the manipulator assembly. As will be further described herein the work piece center of mass 110 is determined in one example as the manipulator assembly 102 orients the work piece 108 through two or more orientations, for instance while moving between two pieces of equipment of an assembly line or testing line.

Referring again to FIG. 1, the center determination system 100 includes in an example a manipulator assembly 102 and a force and torque sensor coupled with the manipulator system 102. In the example shown, the force and torque sensor is interposed between the work piece 108 and the manipulator assembly 102 at an effector assembly 106. As shown in the example of FIG. 1, the effector assembly 106 is coupled with the manipulator assembly 102 at an effector interface 118. In another example, the effector assembly 106 is integral to the manipulator assembly 102. For instance, the effector assembly 106 including the force and torque sensor is provided as a portion of the effector interface 118.

The manipulator assembly 102 shown in FIG. 1 includes a multiple degree of freedom robotic arm (e.g., a manipulator arm 104). As shown, the manipulator arm 104 includes a manipulator base 112, a manipulator boom 114 and a manipulator arm member 116 coupled together at a plurality of joints interposed therebetween. As further shown in FIG. 1, each of the manipulator base 112, the manipulator boom 114, the manipulator arm member 116 as well as the effector interface 118 are operated (rotated, twisted, spun or the like) with one or more actuators at joints. For instance, as shown in FIG. 1 the manipulator base 112 is shown coupled with the manipulator boom 114 with an interposing base actuator 120 that provides rotational actuation for the manipulator arm 104. As further shown, a boom actuator 122 is interposed between the manipulator boom 114 and the manipulator base 112 (e.g., coupled with a portion of the base actuator 120) to accordingly provide another axis of rotational movement for the manipulator arm 104. As further shown in FIG. 1, an arm actuator 124 is interposed between the manipulator arm member 116 and the manipulator boom 114 to provide for rotational movement of the manipulator arm member 116 relative to the manipulator boom 114. In yet another example, an interface actuator 126 is interposed between the manipulator arm member 116 and the effector interface 118 to accordingly provide one or more of rotation or tilting of the work piece 108 for instance by way of rotation or tilting of the effector interface 118 relative to the manipulator arm member 116. As shown in FIG. 1 the work piece 108 is coupled with the manipulator arm member 116 by way of the effector interface 118. The manipulator arm 104 is in one example a multiple degree of freedom robotic arm manufactured or sold by ABB, Kuka, Staubli, Fanuc or other entities.

Referring again to FIG. 1 the center determination system 100 in another example includes a center of mass determination module 128. As shown in the schematic view the center of mass determination module 128 is in communication with components of the center determination system 100 including, but not limited to, the manipulator assembly 102 (one or more of the actuators described herein) as well as the effector assembly 106 including for instance the force and torque sensor. As shown in FIG. 1, in one example the center of mass determination module 128 includes a manipulation element 130. The manipulation element 130 provides instructions to each of the actuators such as the base actuator 120, the boom actuator 122, the arm actuator 124 and the interface actuator 126. In another example, the manipulation element 130 provides instructions, for instance through the effector assembly 106, to the work piece 108 coupled to the effector assembly 106 to reconfigure itself for instance for the determination of a second center of mass. As shown in FIG. 1 the work piece 108 includes a work piece center of mass 110. In another example in a reconfigured state, for instance with one or more portions of the work piece 108 removed or reoriented (corresponding to jettisoned rocket stages, fins, canards or the like, deployment of solar panels, instruments or the like), the work piece 108 has a second work piecework piece center of mass. In such an example, the center of mass determination module 128 measure the work piece center of mass 110 (shown in FIG. 1) as well as second, third or supplemental centers of mass of the work piece 108. Additionally the manipulation element 130 moves the work piece 108 through the plurality of orientations (two or more) to facilitate the sensing and measurement of the work piece center of mass 110 (and supplemental work piece centers of mass as desired).

As further shown in FIG. 1, the center of mass determination module 128 further includes a force and torque measurement element 132. The force and torque measurement element 132 is in communication with the effector assembly 106 (including the force and torque sensor in either the integral or separate examples described herein). The force and torque measurement element 132 measures the force and torque at the effector assembly 106 during the manipulation of the work piece 108 in the two or more different orientations to thereby determine components of the location of the work piece center of mass 110. As further shown in FIG. 1 an identification element 134 is also included with the center of mass determination module 128 to facilitate the identification of the work piece center of mass 110 for instance by analysis of the force and torque measurements taken for the work piece 108 in the two or more orientations.

As described herein in one example the manipulator assembly 102 includes a manipulator arm 104. As shown in FIG. 1 one example of a manipulator arm 104 includes a robotic arm having a plurality of degrees of freedom (e.g., a multi-axis arm) for instance degrees of freedom provided by joints between one or more of the effector interface 118, the manipulator arm member 116, the manipulator boom 114 and the manipulator base 112. In another example, the manipulator assembly 102 includes one or more other manipulator systems including, but not limited to, multi-position and multi-axis fixtures coupled with the work piece 108. In one example, the fixtures are reoriented by way of a gyroscope, rails, positionable rings or the like to accordingly reposition the work piece 108 in the two or more orientations used to identify the work piece center of mass 110. Accordingly, the manipulator assembly 102 is not limited to the manipulator arm 104 but instead includes a plurality of systems including, but not limited to, the manipulator arm 104, gimbals, manipulation fixtures or the like configured to orient the work piece 108 in a plurality of orientations for identification of the work piece center of mass 110.

Figure 2A:
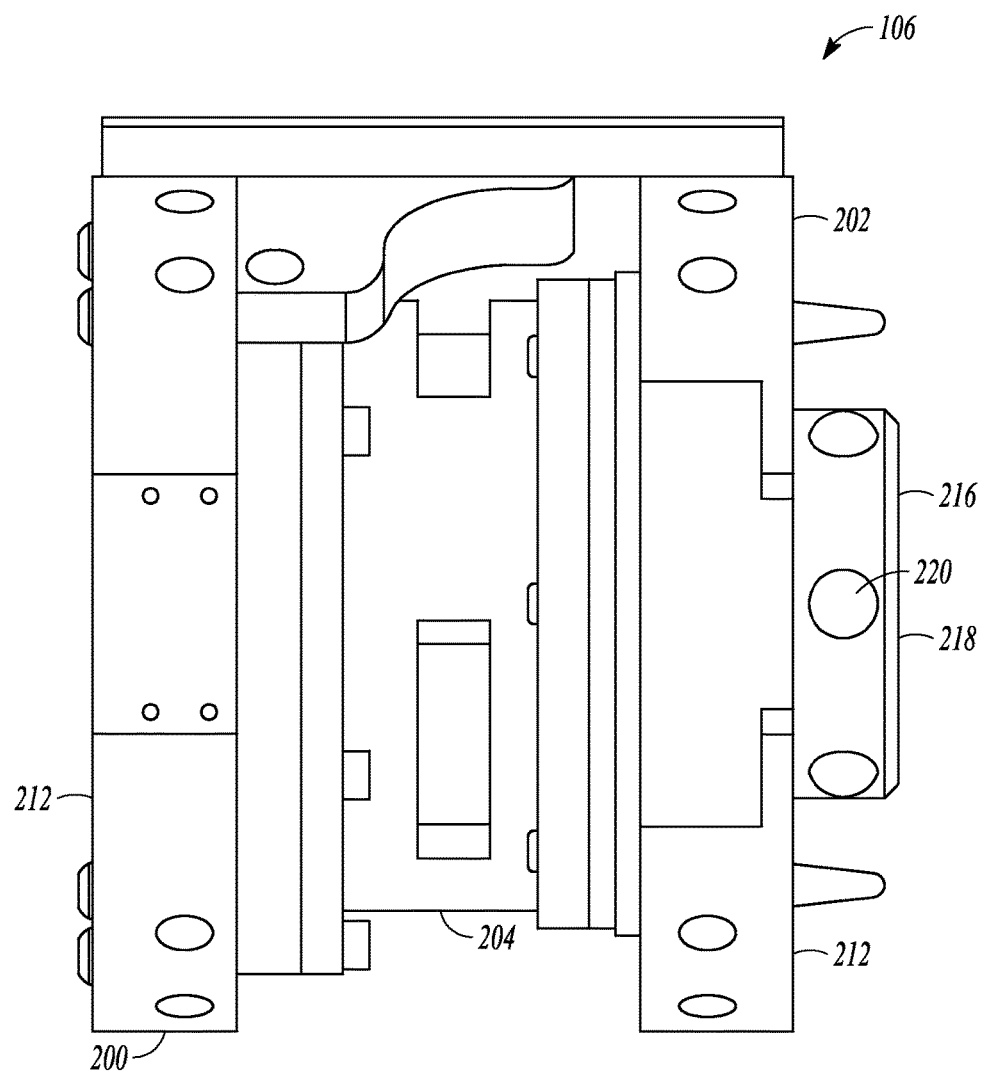
FIG. 2A is a side view of one example an effector assembly.
Figure 2B:
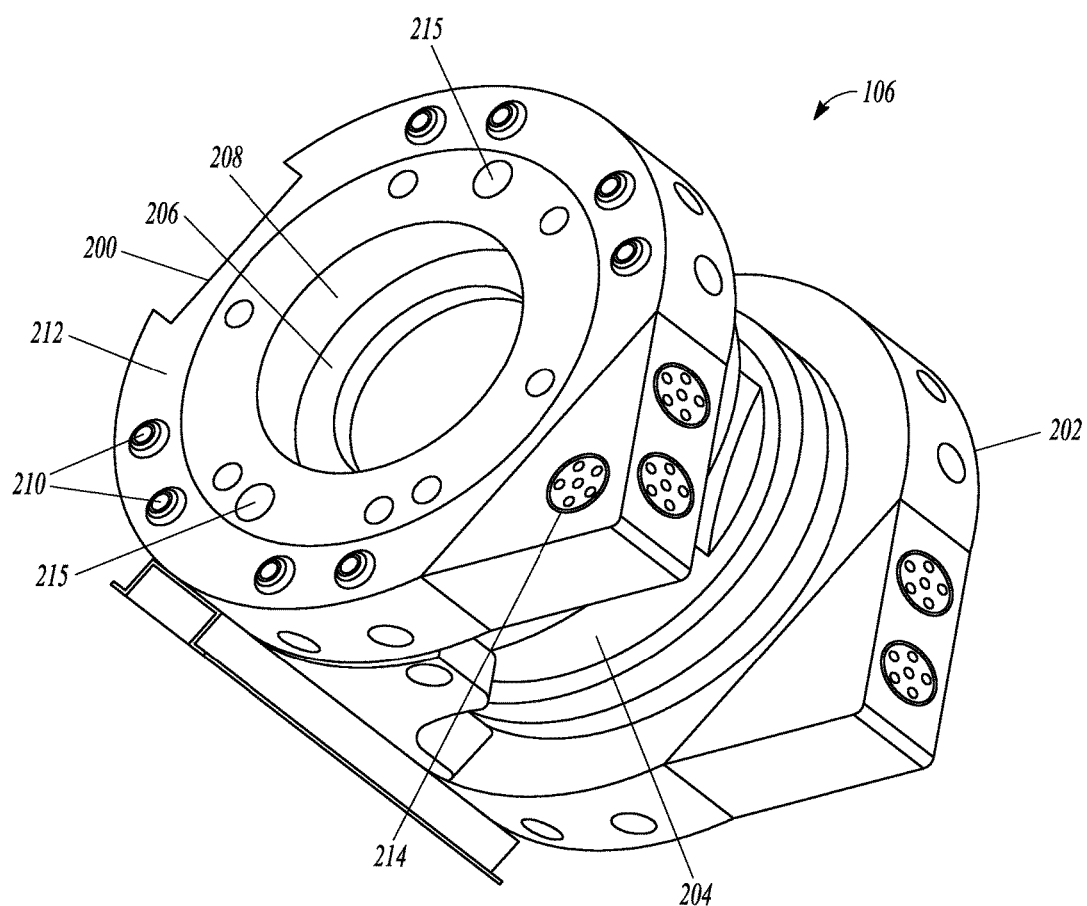
FIG. 2B is a perspective view of one example of the effector assembly of FIG. 2A.
Figure 2C:
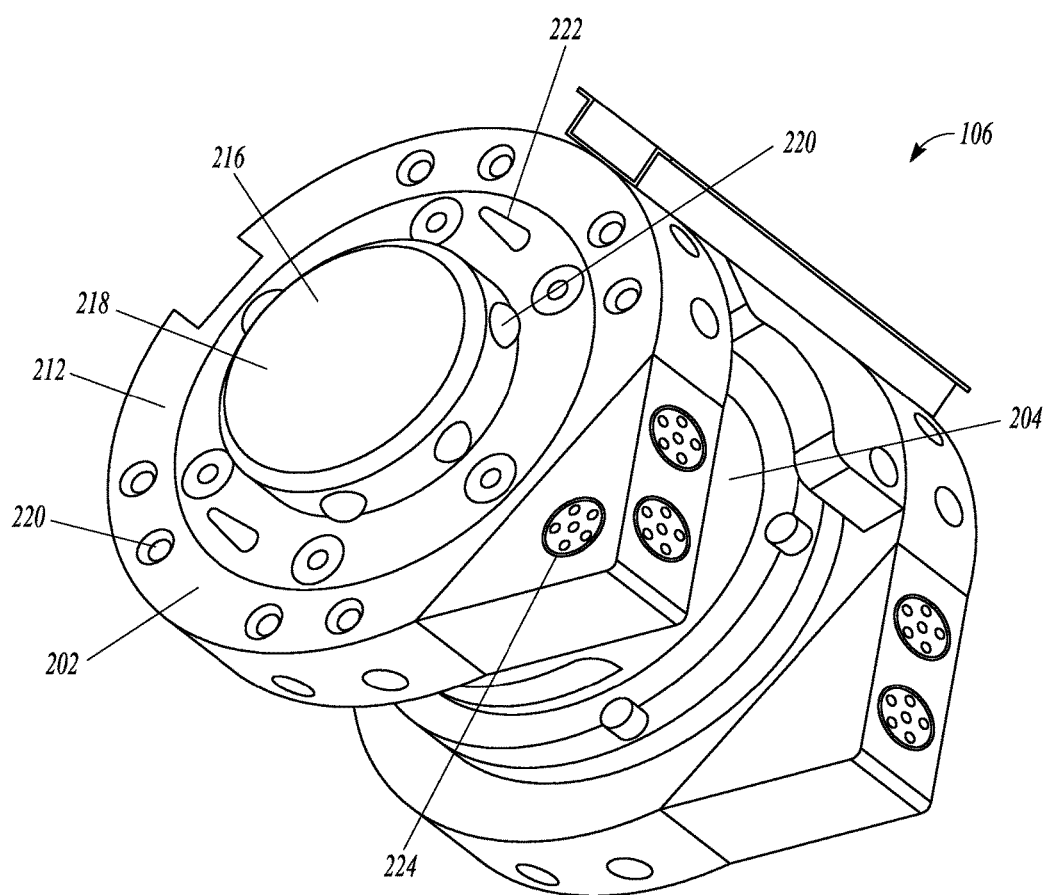
FIG. 2C is a second perspective view of the effector assembly of FIG. 2A.

FIGS. 2A-C show one example of an effector assembly 106 configured for coupling with an interface such as the effector interface 118 of the manipulator assembly 102 shown in FIG. 1. Referring first to FIG. 2A, the effector assembly 106 is shown with a manipulator interface 200 and a work piece interface 202. In one example, the manipulator interface 200 is sized and shaped for coupling with a portion of the manipulator assembly 102 such as the effector interface 118. As will be described herein, the manipulator interface 200 optionally has a standardized fitting configured for coupling with a corresponding component of the effector interface 118 to facilitate the coupling of the manipulator interface 200 of the effector assembly 106 with the manipulator assembly 102. In a similar manner, the work piece interface 202 includes a corresponding fitting configured for coupling with the work piece such as the work piecework piece 108 shown in FIG. 1. That is to say, the work piece interface 202 includes one or more standardized fittings (mechanical latches, sockets or the like) sized and shaped to couple with the work piece for instance a work piece lug coupled with the work piecework piece 108 to facilitate the fixed coupling of the work piece 108 to the manipulator assembly 102 for manipulation of the work piece 108 during center of mass identification.

The force and torque sensor 204 is interposed between the manipulator and work piece interfaces 200, 202. As described herein the force and torque sensor 204 measures force (e.g., weight, mass as related to weight by gravity or the like) and torque of the work piece 108 while in a cantilevered position extending from the effector assembly 106. The force and torque sensor 204 is in one example, a composite sensor including both force and torque measurement capabilities. In another example, the force and torque sensor 204 includes separated sensors coupled together or within an consolidated housing. Some examples of force and torque sensors included, but are not limited to, sensing assemblies manufactured or sold by Omega, Futek, Kistler, RobotIQ, ATI.

Referring now to FIG. 2B, a perspective view of the effector assembly 106 is provided including the manipulator interface 200. As shown, the manipulator interface 200 includes an arm reception socket 206 (e.g., a mechanical latch or part of a mechanical latch). The arm reception socket 206 optionally includes a latch groove 208 extending along the annular interior surface of the arm reception socket 206. The latch groove 208 is sized and shaped to receive a plug, such as a mechanical latch (or component of a mechanical latch including the socket 206) including a corresponding shape to the arm reception socket 206. In one example, the plug includes one or more latch bearings that are operated for instance with a pneumatic piston to drive the bearings into tight snug engagement along the surfaces of the latch groove 208 of the arm reception socket 206. One example of a mechanical latch 216 is shown on the opposed work piece interface 202 (see FIG. 2C), and a similar mechanical latch is optionally included with the effector interface 118 for use with the manipulator interface 200 and the arm reception socket 206. As described herein, the mechanical latch includes one or more of the arm reception socket 206 (and the latch groove 208) and the latching mechanism, such as the exemplary mechanical latch, latch 216. That is to say the mechanical latch includes one or more of the socket and latch received in the socket.

In another example, the manipulator interface 200 includes a latch collar 212 housing the arm reception socket 206 and the latch groove 208. Optionally, the latch collar 212 provides a housing for one or more effector pneumatic ports 210 configured to provide pneumatic fluid (e.g., air) to the effector assembly 106 for instance to supply pneumatic actuation at the work piece interface 202, such as at the mechanical latch 216 and latch bearings 220 (as further described herein).

Referring again to FIG. 2B, in one example the manipulator interface 200, for instance the latch collar 212, also includes a data and power link 214. The data and power link 214 is provided in broken lines in FIG. 2B to expose and thereby show the force and torque sensor 204. As will be described herein, in one example the data and power link 214 allows for communication between the center of mass determination module 128 and the effector assembly 106, for instance the force and torque sensor 204. In another example, the data and power link 214 is an interface to the work piece 108 for instance to convey instructions to reconfigure the work piece. As will be described herein, in another example the latch collar 212 of the work piece interface 202 includes a second data and power link 224. In one example, the second data and power link 224 is in communication with the data and power link 214 shown in FIG. 2B to transmit instructions from the manipulator interface 200 (coupled with the effector interface 118 and a corresponding data port thereon) to the work piece 108. The second data and power link 224 is in one example coupled with a corresponding port provided on the work piece 108. Accordingly, by providing instructions through the data and power links 214, 224 reconfiguring or implementation of testing procedures for the work piece 108 are readily transmitted through the effector assembly 106 to the work piece 108.

Referring now to FIG. 2C, the effector assembly 106 is shown from an opposed view, for instance showing an end of the work piece interface 202. In a similar manner to the manipulator interface 200 the work piece interface 202 includes a latch collar 212, and the latch collar extends around a mechanical latch 216. As shown, the latch collar 212 surrounds the mechanical latch 216 and further provides an interface to a work piece, such as the work piece 108 shown in FIG. 1. For instance, as shown in FIG. 2C the latch collar 212 includes in one example a second data and power link 224 sized and shaped for coupling with a corresponding data port on the work piece 108. As described herein the second data and power link in such an arrangement is used to convey information to and from the work piece, for instance instructions to reconfigure the work piece 108 into a deployed configuration, a transformed configuration (without one or more rocket stages, with the shell removed, with solar panels or instruments repositioned or the like). In another example, the second data and power link 224 initiates testing procedures in the work piece 108 to thereby allow the work piece 108 to assume a partially active state, for instance during the center of mass determination conducted with the center of mass determination module 128. Accordingly the second data and power link 224 facilitates the operation of the work piece 108 for one or more different testing operations that are distinct or related to the center of mass determination.

Referring again to FIG. 2C, as shown the work piece interface 202 in one example includes a plurality of effector pneumatic ports 220. In a similar manner to the second data and power link 224, in one example the effector pneumatic ports 220 are provided on the work piece interface 202 to accordingly provide pneumatic power to the work piece 108. As previously described herein the manipulator interface 200 (see FIG. 2B) also includes a plurality of effector pneumatic ports 210. In one example the effector pneumatic ports 210 of the manipulator interface 200 are coupled with the pneumatic ports 220 of the work piece interface 202 with one or more pneumatic tubes extending between the ports.

As further shown in FIG. 2C, the mechanical latch 216 is shown in this example as a projecting component extending from the work piece interface 202. For instance, the mechanical latch 216 includes, but is not limited to, a latch plug 218 sized and shaped for reception within a socket such as a socket similarly configured to the arm reception socket 206 shown in FIG. 2B. Such a socket for the work piece 108 is provided by way of a standardized fitting or lug provided on the work piece. The reception of the latch plug 218 within a corresponding socket in one example allows for the deployment of one or more bosses, projections or the like including for instance the latch bearings 220 into a corresponding latch groove to anchor the work piece 108 to the effector assembly 106. In one example a pneumatic piston is provided within the latch plug 218 that is driven in a downward (out of the page) fashion to deploy the latch bearings 220 into the corresponding latch groove of the work piece 108. In this manner the manipulator interface 200 fixedly couples the effector assembly 106 to the work piece 108. Similarly, the reception of a mechanical latch of the effector interface 118 in the arm reception socket fixedly couples the effector assembly 106 to the manipulator assembly 102. Accordingly the work piece 108 is solidly clamped to the manipulator assembly 102 with the force and torque sensor 204 coupled to the work piece 108 to ensure the work piece is robustly coupled (force and torque is measured) while moved through the plurality of orientations used for the center of mass determination (with the center of mass determination module 128 shown in FIG. 1).

In another example, referring again to FIGS. 2B, C one or more of the manipulator interface 200 and the work piece interface 202 include alignment pins or alignment sockets configured to align the various ports such as the effector pneumatic ports 210, 220, the data and power link 214, 224 or the like with corresponding features on either of the effector interface 118 or the work piece 108. For instance, referring to FIG. 2B alignment sockets 215 are provided on opposed sides of the latch collar 212. The alignment sockets 215 are sized and shaped to receive two or more pins, such as alignment pins, extending from the effector interface 118. Reception of the alignment pins within the alignment sockets 215 ensures alignment between pneumatic ports and data and power links on each of the effector interface 118 and the manipulator interface 200. Accordingly, with coupling of the effector interface 118 to the manipulator interface 200 the effector pneumatic ports 210 and the data and power link 214 are automatically coupled with the corresponding components of the effector interface 118.

In a similar manner, FIG. 2C includes one or more alignment pins 222 sized and shaped for reception within corresponding sockets provided on the work piece 108. The alignment pins 222, when received within corresponding alignment sockets, ensure the effector pneumatic ports 220 and the second data and power link 224 (where present) or the like are automatically aligned with the corresponding components on the work piece 108.

Figure 3:
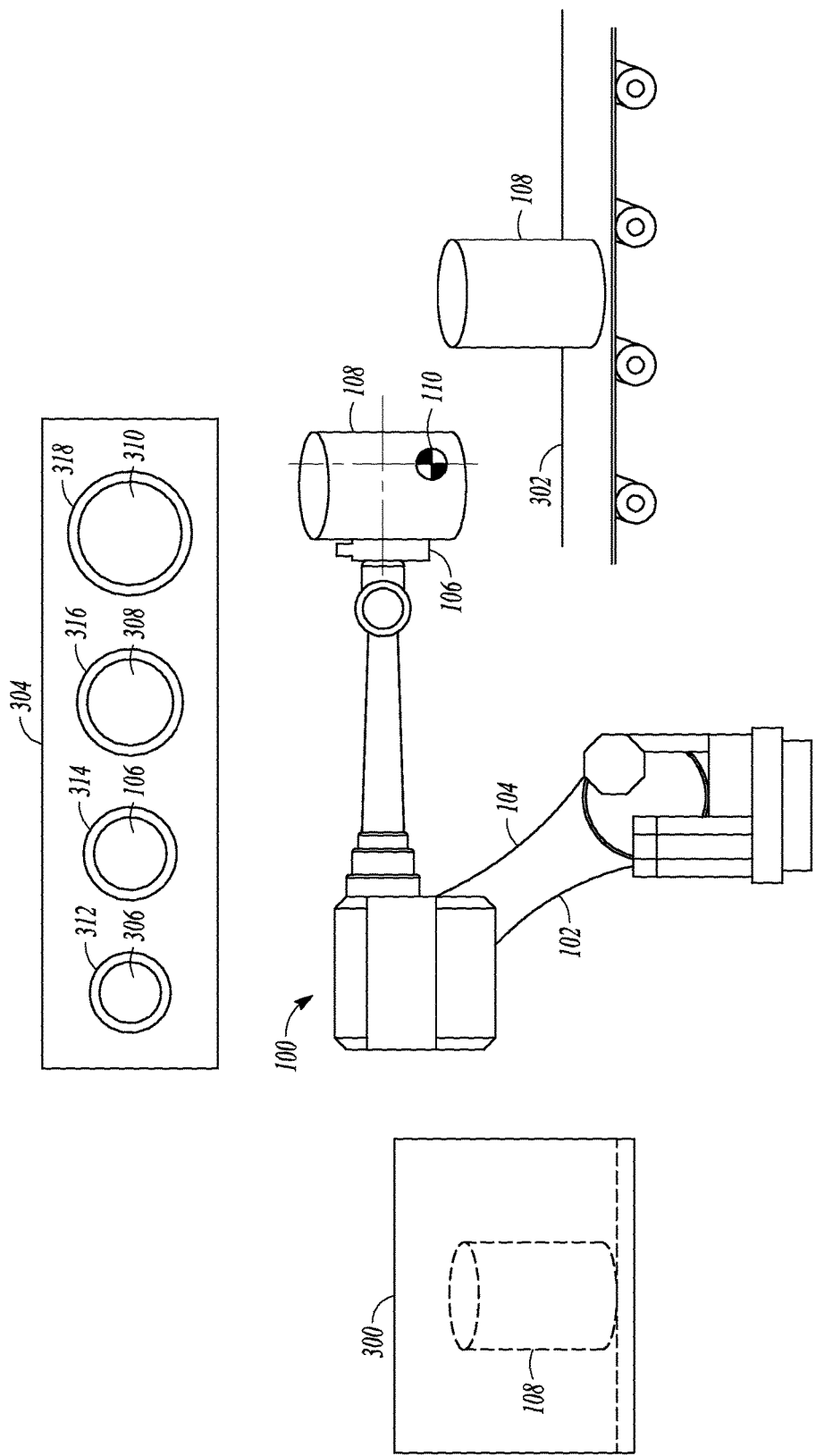
FIG. 3 is a perspective view of another example of a system including a magazine of effector assemblies.

FIG. 3 shows the center determination system 100 interposed between two pieces of equipment, such as first and second pieces of equipment 300, 302. As previously described herein, the first and second pieces of equipment 300, 302 are in one example stations or components of a larger assembly or testing line used with one or more work pieces, such as the work pieces 108 shown in FIG. 3. For instance the first piece of equipment 300 includes but is not limited to a conveyor, assembly line station, testing station or the like that transports or interacts with the work piece 108. The manipulator assembly 102, for instance including a manipulator arm 104, couples with the work piece 108 at the first piece of equipment 300 and moves the work piece 108 to the second piece of equipment 302.

As further shown in FIG. 3, the second piece of equipment 302 is in one example a conveyor. In another example the second piece of equipment 302 includes, but is not limited to, another piece of equipment for instance a component of assembly or testing lines. By including the center determination system 100 in line with an assembly or testing line (e.g., between first and second pieces of equipment 300, 302) the work piece center of mass 110 is readily and rapidly determined between the pieces of equipment without otherwise removing the work piece 108 from the assembly or testing line. Accordingly each of the work pieces 108 for instance a plurality of work pieces moved along the assembly or testing lines automatically have their work piece centers of mass 110 identified without transport and testing at a separate center of mass measurement and identification station including, but not limited to, a load table housed at a separate portion of a manufacturing floor or in an entirely different building.

The manipulator assembly 102 orients the work piece 108 in two or more differing orientations between the first and second pieces of equipment 300, 302 to determine the work piece center of mass 110 shown in FIG. 3. In each of the two or more orientations between the first and second pieces of equipment 300, 302 one or more of forces and torques are measured by the force and torque sensor 204 (see FIGS. 2A-C) for the work piece 108 to identify the work piece center of mass 110. In each of the two or more orientations the force and torque sensor 204 measures one or more of the force and torque incident on the sensor 204 determine one or more components (x, y and z components) of the location of the work piece center of mass 110. Accordingly after movement of the work piece 108 from the first piece of equipment 300 to the second piece of equipment 302 the work piece center of mass 110 is identified and the work piece 108 continues along one or more of the assembly or testing lines.

In another example the center determination system 100 is configured to operate the work piece 108. As previously described herein, the center determination system 100 includes a data and power link such as the data and power links 214, 224 shown in FIGS. 2B and 2C. The center determination system 100, for instance through the center of mass determination module 128, reconfigures the work piece 108 into one or more differing orientations (e.g., with panels, instruments or the like deployed relative to the remainder of the work piece). Redeployment or reconfiguring of the work piece 108 moves the work piece center of mass 110 and generates second, third or supplemental work piece centers of mass accordingly to the number of configurations. In one example the manipulator assembly 102 moves the work piece 108 in each these configurations into two or more orientations to accordingly identify the corresponding centers of mass. The first work piece center of mass 110 as well as supplemental work piece centers of mass (second, third or the like) are determined for the work piece 108 while moving the work piece 108 between the first and second pieces of equipment 300, 302. Time consuming steps including bolting of the work piece, measurement of weight with multiple sensors, decoupling and reorienting the work piece, and remeasurement (and optional reconfiguration) of the work piece 108 on load tables is thereby avoided.

Additionally in another example the center of mass determination module 128, by way of the data and power links 214, 224, is configured to conduct one or more tests or other procedures on the work piece 108 unrelated to the center of mass determination. For instance, the center of mass determination module 128 (including for instance another testing module separate from center of mass identification) is configured to operate one or more systems or subsystems of the work piece 108 to test the systems and determine the operability of the overall work piece 108.

While communication between the center of mass determination module 128, the effector assembly 106 (including the force and torque sensor 204) and the work piece 108 are discussed in examples herein with data and power links 214, 224 in another example, communication between features of the center determination system 100 is conducted with, but not limited to, wired communication, wireless communication elements (e.g., blue tooth, radio frequency, near field or the like) or the like. Stated another way, the data and power links 214, 224 described herein are broadly considered to cover communication interfaces (e.g., contacts and receptacles containing the same), wired connections, wireless connections and the like.

Referring again to FIG. 3 in another example the center determination system 100 includes an effector magazine 304. One example of the effector magazine 304 is shown in a schematic fashion at the top of FIG. 3. As shown, the effector magazine 304 includes a plurality of effector assemblies 106, 306, 308, 310. The effector assemblies 106, 306-310 are in one example configured to each have varying load capabilities. That is to say the effector assembly 106 shown in FIG. 3 coupled with the manipulator assembly 102 has a first set of load capabilities (force and torque range) while the other effector assemblies 306, 308, 310 have load capabilities different relative to the effector assembly 106. For instance, in one example the effector assembly 310 is configured to have a high load capability for force and torque relative to the other effector assemblies such as the effector assemblies 106, 306 and 308. Conversely, the leftmost effector assembly 306 has a smaller load capacity relative to the remainder of the effector assemblies 106, 308, 310. Optionally, one or more of the effector assemblies 106, 306-310 have similar or identical load capabilities and are used as replacement effector assemblies when an error or fault is detected with an installed effector assembly.

Each of the effector assemblies 306, 106, 308, 310 are in one example stored in the effector magazine 304 for instance in one or more effector receptacles 312, 314, 316, 318 sized and shaped to receive each of the effector assemblies therein. In one example the effector assemblies 306 have similar footprints that vary with regard to size and are received in similarly sized receptacles 312-318. In another example, the effector assemblies 306, 106, 308, 310 have varying shapes and sizes according to the force and torque sensors, mating collars and other components of used with each of the respective effector assemblies. Each of the effector receptacles 312, 314, 316, 318 are accordingly sized and shaped for reception of the appropriate effector assembly therein.

In an example, each of the effector receptacles 312-318 are located at set locations on the effector magazine 304 to facilitate index of the receptacle locations for use with the automated manipulator assembly 102. In another example, each of the effector receptacles 312-318 the effectors 106, 306-310 (or both) include one or more of RFID chips, barcodes, signal generators, recognizable labels (e.g., machine vision) or the like to facilitate the identification of the appropriate receptacles as well as the effector assemblies therein. The center determination system 100 includes an identification mechanism, including, but not limited to, a photo eye, machine vision sensor, RFID sensor or the like configured to read one or more labels on the effector assemblies themselves or the appropriate effector receptacles. The center determination system 100 identifies the appropriate effector assembly 306 needed for a particular work piece 108 (also having its own identification chip, label or the like), manipulates the effector interface 118 (FIG. 1) into alignment with the specified effector assembly and couples with the effector assembly 306, 106, 308, 310 having an appropriate force and torque capability to measure the center of mass of the work piece 108.

In operation, a work piece 108 at the first piece of equipment 300 is scanned at some point along the assembly or testing line (or by the center determination system 100 including an appropriate sensor). Recognition of the type of work piece 108 prompts the center determination system 100 to identify the appropriate effector assembly from the effector magazine 304. The center determination system 100 in such an example moves the a presently installed effector assembly 106 into its effector receptacle 314 and decouples and stores the effector assembly 106 therein. The appropriate effector assembly, for instance the effector assembly 310, within the corresponding effector receptacle 318 is coupled with the manipulator assembly 102 at the effector interface 118 and withdrawn from the effector receptacle 318. As previously described herein, in one example the effector interface 118 couples with the manipulator interface 200 (shown in FIG. 2B) with the reception of a mechanical latch within the arm reception socket 206.

After coupling the effector assembly 310 with the manipulator assembly 102 the manipulator assembly 102 reorients the effector assembly 310 to couple with the work piece 108. The coupled work piece 108 is moved between the first and second pieces of equipment 300, 302 through at least two orientations where one or more of force and torque measurements are conducted on the work piece 108. The work piece center of mass 110 is determined (e.g., with the force and torque measurement and identification elements 132, 134 of the center of mass determination module 128 shown in FIG. 1). The work piece 108 is positioned on the second piece of equipment 302 where the work piece 108 continues along to another assembly line station or testing station of an overall assembly or testing line.

Figure 4A:
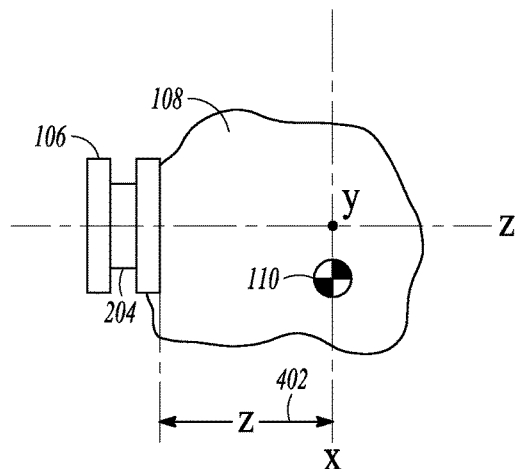
FIG. 4A-E are schematic diagrams of a work piece moved through a plurality of different orientations.
Figure 4B:
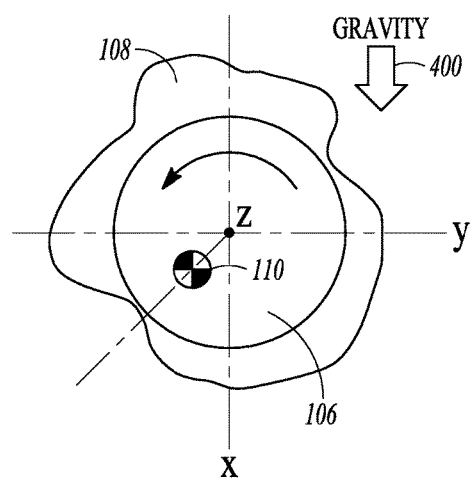
Figure 4C:
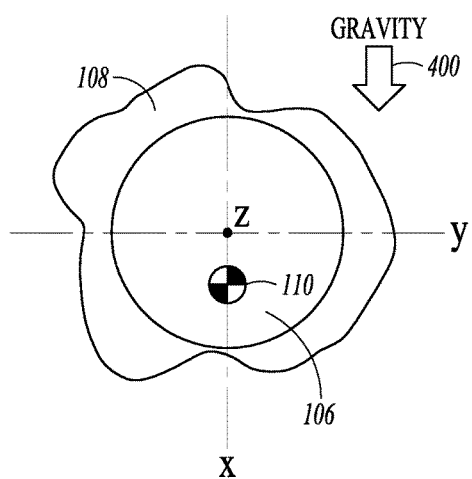
Figure 4D:
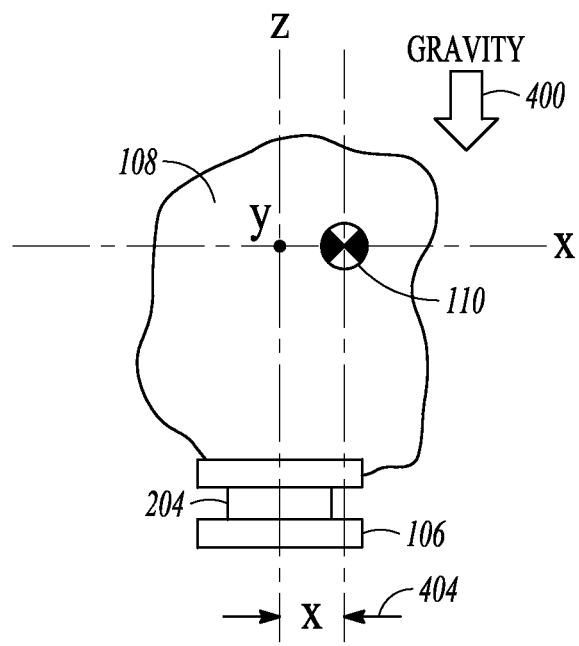
Figure 4E:
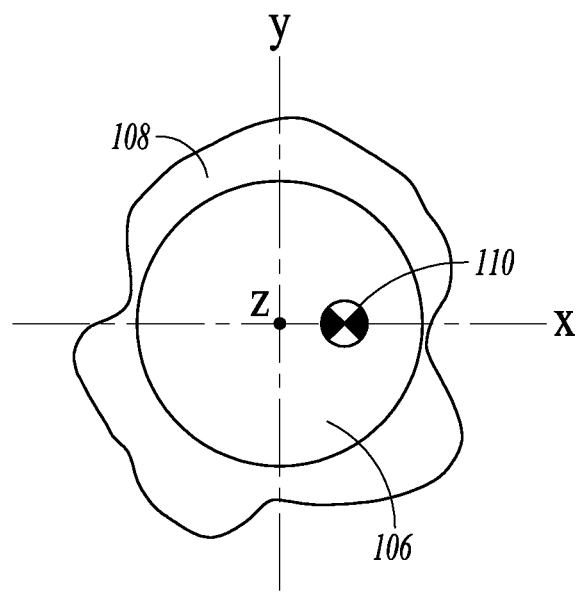

FIGS. 4A-E show the work piece 108 coupled with the effector assembly 106 of the center determination system 100 (see FIGS. 1 and 3) in a plurality of orientations including a first orientation shown in FIGS. 4A-C and a second orientation shown in FIGS. 4D, E. In the examples shown in FIGS. 4A-E the work piece 108 is shown in the (at least) two orientations to identify the work piece center of mass 110 as described herein. Although the example provided in FIGS. 4A-E shows the work piece in two orientations for determining the work piece center of mass 110 in another example the work piece 108 is oriented through three or more orientations to provide increased resolution and enhanced accuracy of the work piece center of mass 110 location. As discussed herein the orientation shown in FIGS. 4A-C is labeled as a first orientation and the orientation shown in FIG. 4D-E is labeled as a second orientation. Labeling of the orientation is a convention and not limiting. Accordingly, the orientation shown in FIGS. 4A-C is alternatively labeled the second orientation and the orientation shown in FIGS. 4D-E is labeled the first orientation in another example. Alternative orientation labels are also used in other examples including, but not limited to, upright, lateral, vertical, horizontal, first angle, second angle or the like.

Referring first to FIG. 4A, the work piece 108 is shown in a first orientation (e.g., a lateral orientation) with the work piece center of mass 110 positioned along an imaginary x axis extending downward. The y axis extends into and out of the page and the z axis extends from the left to the right for instance through the effector assembly 106. The gravity vector 400 is shown in a downward direction relative to the work piece 108 and effector assembly 106. Although the orientation shown in FIG. 4A includes the work piece 108 extending laterally from the effector assembly 106, in another example the work piece 108 extends at substantially any orientation from the effector assembly (along an axis, at an angle to one or more axes including the gravity vector 400 or the like) that differs from the orientation used as the second orientation.

In the first orientation shown in FIG. 4A, a component of the work piece center of mass 110 location, an exemplary z location 402 is determined relative to the effector assembly 106. At FIG. 4B the work piece 108 is rotated in a clockwise or counterclockwise fashion around the z axis (FIG. 4B is an end view of the work piece 108) to align the work piece center of mass 110 with the x axis. The aligned work piece center of mass 110 is shown in FIG. 4C. In one example, the work piece 108 is rotated around the z axis until the torque measured around the z axis is zero (newtons per meter, pounds per foot, pounds per inch or the like). Once the torque measurement around the z axis is zero the work piece center of mass 110 is aligned with the x axis and accordingly the z location for the center of mass 110 is along a plane of potential points formed by the x and z axes. In the orientation shown in FIG. 4C the torque of the work piece 108 incident on the effector assembly 106 is measured with the force and torque sensor 204 shown in FIGS. 2A-C. In one example, the torque measurement taken by the effector assembly 106 is stored in a module, such as the center of mass detection module 128 including a storage element therein.

Referring now to FIG. 4D, the work piece 108 is shown in a second orientation for instance in a substantially vertical orientation (e.g., an upright orientation) relative to the effector assembly 106. Although the orientation shown in FIG. 4D includes the work piece 108 upright relative to the effector assembly 106, in another example, the work piece 108 extends at substantially any orientation from the effector assembly (along an axis, at an angle to one or more axes including the gravity vector 400 or the like) that differs from the orientation used as the first orientation.

In the second orientation shown in FIGS. 4D and 4E another torque measurement is taken as well as a weight measurement (force measurement) to determine the mass or weight of the work piece 108. Referring first to FIG. 4D, the work piece 108 is shown in the substantially vertical orientation relatively above the effector assembly 106 including the force and torque sensor 204. As shown, the work piece 108 is manipulated relative to another axis (e.g., the y axis) until the torque measured by the force and torque sensor 210 about the y axis is zero. In this orientation the work piece center of mass 110 is aligned with the x axis as well as the y axis and thereby a plane of potential locations of the center of mass 110 is provided along the x axis. In this orientation a second torque measurement is conducted by the force and torque sensor 204 and the force and torque sensor also measures the weight of the work piece 108 incident on the sensor 204.

With the weight of the work piece 108 known and two torque measurements taken in each of the two orientations shown in FIGS. 4A-E the location of the work piece center of mass 110 is determined. For instance referring to FIG. 4C, the y location of the center of mass is determined to be zero relative to the intersection of the x axis, y axis and z axis (an origin at the effector assembly 106). The z location shown for instance in FIG. 4A is determined by equating the torque measurement in the orientation shown in FIGS. 4C and 4A to the force or the weight of the work piece 108. The torque and force equation (T=F×D) is solved to determine the z location 402 of the work piece center of mass 110 corresponding to the moment arm measured from the work piece center of mass 110 to the effector assembly 106. In a similar manner the torque measurement with the work piece 108 in the orientation shown in FIGS. 4D and 4E (4E being a bottom view of the work piece 108 in 4D) is equated to the measured force (e.g., the weight of the work piece 108) and solved for the x location 404 shown in FIG. 4D (corresponding to the moment arm between the work piece center of mass 110 and the effector assembly 106). The x location 404 shown in FIG. 4D and the z location 402 shown in FIG. 4A along with the corresponding y location of the work piece center of mass 110 (zero along the y axis) accordingly provides a three dimensional identification of the work piece center of mass 110 for the work piece 108.

Optionally, where one or more of the first and second orientations are at angles relative to axes and the gravity vector 400 the moment measurements and force measurements are used with corresponding equations including component forces and vectors (e.g., sin, cosine, tangent components or the like) to identify the location of the work piece center of mass 110.

In another example the work piece 108 is oriented into a third orientation to accordingly provide another dimensional location for the work piece center of mass 110. In combination with the previous torque measurements and the measured weight the location of the work piece center of mass 110 is determined relative to another axis to further refine the location of the work piece center of mass 110.

In still another example and as previously described herein, the center determination system 100 including the center of mass determination module 128 is coupled with the work piece 108 by one or more of the data and power links 214, 224 shown for instance in FIGS. 2B and 2C, wired connections, wireless connections or the like. The center of mass detection module 128 in one example reconfigures the work piece 108 into one or more configurations including a deployed configuration (with one or more solar panels or other instruments deployed relative to the remainder of the work piece) or another orientation, for instance where one or more pieces of equipment have moved inside or around the work piece 108, that changes the work piece center of mass. In the reconfigured orientation the work piece 108 includes a second work piece center of mass different from the work piece center of mass 110 (e.g., shown in FIGS. 4A-E). In such an example the work piece 108 is oriented through two or more orientations and corresponding torque measurements are used with the overall weight of the assembly (assuming the weight stays the same, if the weight changes the weight measurement is taken again) and the updated torque measurements are used to re-identify the work piece center mass such as a second work piece center mass corresponding to the reconfigured work piece 108.

Figure 5:
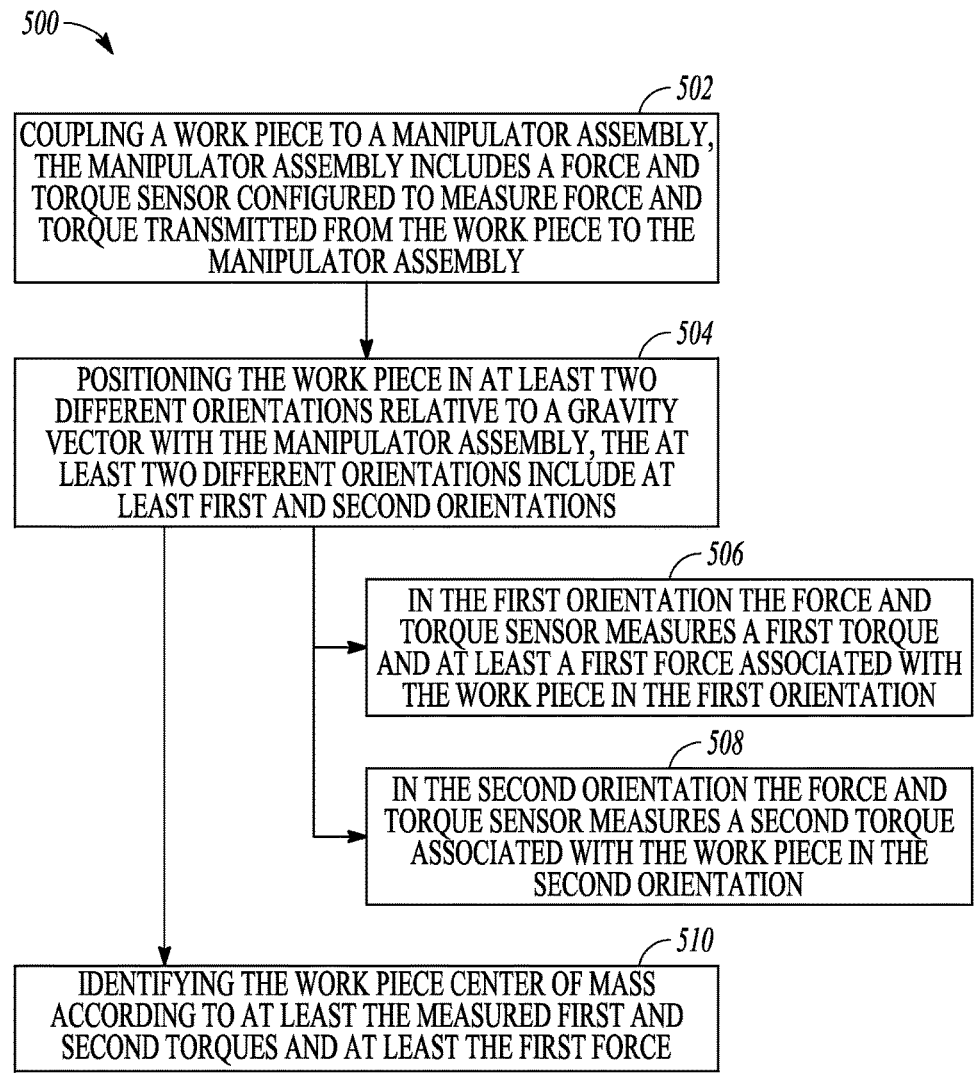
FIG. 5 is a block diagram showing one example of a method for automatically identifying a work piece center of mass.

FIG. 5 shows one example of a method 500 for automatically identifying a work piece center of mass, such as the center of mass 110 (shown in FIG. 1). In describing the method 500 reference is made to one or more components, features, functions and steps previously described herein. Where convenient, reference is made to the components, features, steps and the like with reference numerals. The reference numerals provided are exemplary and are not exclusive. For instance, components, features, functions, steps and the like described in the method 500 include, but are not limited to, the corresponding numbered elements provided herein, other corresponding features described herein (both numbered and unnumbered) as well as their equivalents.

At 502, the method 500 includes coupling a work piece 108 to a manipulator assembly 102. The manipulator assembly 102 includes a force and torque sensor 204 configured to measure force and torque transmitted from the work piece 108 to the manipulator assembly 102 (e.g., to the sensor 204). As described herein, in one example the manipulator assembly 102 in combination with the force and torque sensor 204 forms one example of a center determination system 100. Optionally, the force and torque sensor is incorporated with the manipulator assembly 102. For instance the effector assembly 106 shown in FIG. 1 is provided as an integral or incorporated component of the manipulator assembly 102, such as a manipulator arm 104. In another example, the effector assembly 106 including the force and torque sensor 204 and is provided as a separate component coupled with the manipulator assembly 102 (e.g., at an effector interface 118). The effector assembly 106 includes one or more mechanisms such as a mechanical latch 216 sized and shaped for reception in a corresponding portion of the work piece 108 (e.g., a like-shaped work piece lug, socket or the like) to facilitate coupling of the work piece 108 to the effector assembly 106 and the manipulator assembly 102.

At 504, the work piece 108 is positioned in at least two different orientations relative to a gravity vector such as the gravity vector 400 shown in FIGS. 4A-E with the manipulator assembly 102. The at least two different orientations include at least first and second orientations. Examples of the first and second orientations are shown in FIGS. 4A-E provided herein.

At 506, in the first orientation the force and torque sensor measures a first torque associated with a work piece in the first orientation and at least a first force associated with the work piece (for instance the work piece weight). At 508, in the second orientation the force and torque sensor measures a second torque associated with the work piece in the second orientation. Optionally, a second force is measured again and optionally used with the second torque measurement. At 510, the center determination system 100 including a force and torque measurement element 132 and an identification element 134 (included with a center of mass detection module 128) identifies the work piece center of mass 110 according to at least the measured first and second torques and at least the measured first force (e.g., the weight). One example of the identification of the work piece center of mass 110 is provided herein and shown in FIGS. 4A-E.

Several options for the method 500 follow. In one example, the manipulator assembly 102 includes a manipulator arm 104. For instance as shown in FIG. 1 the manipulator arm 104 includes a manipulator base 112, manipulator boom 114, manipulator arm member 116 and an effector interface 118. The manipulator assembly 102 including the manipulator arm 104 includes one or more actuators, for instance a plurality of actuators such as the actuators 120, 122, 124, 126, configured to provide multiple degrees of freedom to the manipulator assembly 102 and thereby facilitate the orientation of the work piece 108 in at least the first and second orientations. In another example, the method 500 includes coupling an effector assembly, such as the effector assembly 106 or other effector assemblies shown in FIG. 3 including the force and torque sensor 204, with the manipulator arm 104. Coupling the work piece 108 to the manipulator assembly 102 (the manipulator arm 104 in one example) includes coupling the effector assembly 106 with the work piece 108.

In another example, positioning the work piece 108 in at least two different orientations includes positioning the work piece 108 in three or more different orientations. The three or more different orientations include the first and second orientations and a third orientation. In the third orientation the force and torque sensor 204 measures a third torque associated with the work piece in the third orientation. Identifying the work piece center of mass 110 includes identifying the work piece center of mass according to at least measured first, second and third torques and at least the measured first force (e.g., the weight of the work piece 108).

In another example and as shown in FIG. 3, the method 500 includes positioning the work piece 108 in at least two different orientations while moving the work piece between first and second pieces of equipment 300, 302. In one example the first and second pieces of equipment 300, 302 are components of an assembly line or testing line used for the construction or assembly of the work piece 108 or its testing.

In still another example, positioning the work piece 108 in at least two different orientations includes positioning relative to first, second and third axes corresponding to exemplary x, y and z axes (see FIGS. 4A-E). For instance, positioning the work piece in at least the two different orientations includes positioning the work piece 108 in the first orientation with a zero moment around the first axis (such as the z axis) to align the work piece center of mass with one of the second or third axes such as an x axis as shown in FIG. 4C. In another example, positioning the work piece in the second orientation includes positioning the work piece in an orientation with a zero moment around a second axis (such as a y axis) to align the work piece center of mass 110 with one of the first or third axes different from the second axis. In the first orientation measuring the first torque includes measuring the first torque around one of the third or second axes unaligned with the work piece center of mass (such as the y axis). In the second orientation measuring the second torque includes measuring the second torque around one of the first or third axes unaligned with the work piece center of mass 110 such as the y axis shown in FIGS. 4D and 4E. Identifying the work piece center of mass 110 includes determining a first location of the work piece center of mass along the first axis based on the measured first torque and the measured weight. Identifying the work piece center of mass includes determining at least a second location of the work piece center of mass 110 along the second axis based on the measured second torque and the measured weight. The work piece center of mass is then indexed according to the determined first and second locations. In one example, the indexed location of the work piece center of mass is indexed relative to the force and torque sensor 204 of the effector assembly 106. In another example the location is indexed relative to an origin for instance an origin provided at a fixed location on the work piece 108.

Optionally, the identified location of the work piece center of mass 110 as shown in FIGS. 4A-E includes a zero y location (see FIGS. 4C, E) as well as a z location 402 measured in the orientation shown in FIG. 4A and an x location 404 measured in the orientation provided in FIG. 4E. With the three values the location of the work piece center of mass 110 is identified. In yet another example and as previously described herein, the work piece 108 is oriented into one or more additional orientations to thereby further refine the location of the work piece center of mass 110 with additional torque measurements. The labels used with the first and second orientations are conventions, and accordingly the labels used for either of the orientations or alternative angled orientations include, but are not limited to, second, first (reversed), lateral, upright, horizontal, vertical, first angle, second angle or the like.

In still another example, the method 500 includes reconfiguring the work piece 108 into a second configuration, such as a deployed or testing configuration, with a work piece second center of mass different from the work piece center of mass 110 previously described herein. The method 500 with the reconfigured work piece 108 includes repeating positioning of the work piece 108 in at least two different orientations with the work piece in the second configuration to measure updated first and second torques (and optionally an updated force). The method further includes identifying the work piece second center of mass according to at least the measured first and second updated torques and the at least one force (optionally an updated force if the work piece weight changes). In one example the at least one updated force includes the weight of the work piece 108. In still another example the work piece changes weight by jettisoning or ejecting one or more components (rocket stages, fins, canards, housings or the like or the like). The weight of the work piece 108 thereby changes and accordingly another updated force such as the reconfigured work piece weight is measured with the force and torque sensor 204.

Various Notes & Examples

Example 1 can include subject matter, such as can include a method for automatically identifying a work piece center of mass comprising: coupling a work piece to a manipulator assembly, the manipulator assembly includes a force and torque sensor configured to measure force and torque transmitted from the work piece to the manipulator assembly; positioning the work piece in at least two different orientations relative to a gravity vector with the manipulator assembly, the at least two different orientations include at least first and second orientations, wherein in the first orientation the force and torque sensor measures a first torque and at least a first force associated with the work piece in the first orientation, and in the second orientation the force and torque sensor measures a second torque associated with the work piece in the second orientation; and identifying the work piece center of mass according to at least the measured first and second torques and at least the first force.

Example 2 can include, or can optionally be combined with the subject matter of Example 1, to optionally include wherein the manipulator assembly includes a manipulator arm, and positioning the work piece in at least two different orientations with the manipulator assembly includes positioning the work piece with the manipulator arm.

Example 3 can include, or can optionally be combined with the subject matter of one or any combination of Examples 1 or 2 to optionally include coupling an effector assembly including the force and torque sensor with the manipulator arm, and wherein coupling the work piece to the manipulator assembly includes coupling the effector assembly with the work piece.

Example 4 can include, or can optionally be combined with the subject matter of one or any combination of Examples 1-3 to optionally include wherein positioning the work piece in at least two different orientations includes positioning the work piece in three or more different orientations, the three or more different orientations including the first and second orientations and a third orientation, in the third orientation the force and torque sensor measures a third torque associated with the work piece in the third orientation, and identifying the work piece center of mass includes identifying the work piece center of mass according to at least the measured first, second and third torques and at least the first force.

Example 5 can include, or can optionally be combined with the subject matter of one or any combination of Examples 1-4 to optionally include wherein positioning the work piece in at least two different orientations is included with moving the work piece between first and second pieces of equipment in one or more of an assembly line or a testing line with the manipulator assembly.

Example 6 can include, or can optionally be combined with the subject matter of Examples 1-5 to optionally include reconfiguring the work piece into a second configuration with a work piece second center of mass, and repeating positioning of the work piece in at least two different orientations with the work piece in the second configuration to measure first and second updated torques and at least one updated force, and identifying the work piece second center of mass according to least the measured first and second updated torques and the at least one updated force.

Example 7 can include, or can optionally be combined with the subject matter of Examples 1-6 to optionally include wherein positioning the work piece in at least two different orientations includes positioning relative to first, second and third axes: positioning the work piece in the first orientation with a zero moment around the first axis to align the work piece center of mass with one of the second or third axes; and positioning the work piece in the second orientation with a zero moment around the second axis to align the work piece center of mass with one of the first or third axes different from the second axis.

Example 8 can include, or can optionally be combined with the subject matter of Examples 1-7 to optionally include wherein in the first orientation measuring the first torque and at least the first force includes: measuring the weight with the force and torque sensor, measuring the first torque around one of the third or second axes unaligned with the work piece center of mass, and wherein in the second orientation measuring the second torque includes measuring the second torque around one of the third or first axes unaligned with the work piece center of mass.

Example 9 can include, or can optionally be combined with the subject matter of Examples 1-8 to optionally include wherein identifying the work piece center of mass includes: determining a first location of the work piece center of mass along the first axis based on the measured first torque and the measured weight, determining a second location of the work piece center of mass along the second axis based on the measured second torque and the measured weight, and indexing the work piece center of mass according to the determined first and second locations.

Example 10 can include, or can optionally be combined with the subject matter of Examples 1-9 to optionally include wherein in the second orientation the force and torque sensor measures the second torque and a second force, and identifying the work piece center of mass according to at least the measured first and second torques and at least the first force includes identifying the work piece center of mass according to at least the measured first and second torques and at least the first and second forces.

Example 11 can include, or can optionally be combined with the subject matter of Examples 1-10 to optionally include a system configured for manipulation of a work piece and determination of a work piece center of mass comprising: a manipulator assembly, the manipulator assembly including a work piece interface configured to grasp and hold a work piece while the manipulator assembly moves the work piece into at least two different orientations; a force and torque sensor coupled with the manipulator assembly, the force and torque sensor configured to measure force and torque transmitted from the work piece to the manipulator assembly; and a center of mass determination module in communication with the manipulator assembly and the force and torque sensor, the center of mass determination module includes: a manipulation element, the manipulation module configured to move the manipulator assembly and the work piece into the at least two different orientations relative to a gravity vector, a force and torque measurement element configured to measure the force and torque of the work piece at each of the at least two different orientations with the force and torque sensors, and an identification element in communication with the force and torque measurement module, the identification module configured to identify the work piece center of mass according to force and torque measurements conducted with the work piece at the at least two different orientations.

Example 12 can include, or can optionally be combined with the subject matter of Examples 1-11 to optionally include wherein the manipulator assembly includes a manipulator arm.

Example 13 can include, or can optionally be combined with the subject matter of Examples 1-12 to optionally include wherein the manipulator assembly includes at least one effector assembly configured for coupling with the manipulator arm, and the at least one effector assembly includes the force and torque sensor.

Example 14 can include, or can optionally be combined with the subject matter of Examples 1-13 to optionally include wherein the effector assembly transitions between at least two effector configurations: in a first configuration the manipulator arm is coupled with the effector assembly at a manipulator interface of the effector assembly, and in a second configuration the effector assembly coupled with the manipulator arm is coupled with the work piece at a work piece interface of the effector assembly with a mechanical latch of the effector assembly.

Example 15 can include, or can optionally be combined with the subject matter of Examples 1-14 to optionally include wherein the mechanical latch includes pneumatic operated fasteners.

Example 16 can include, or can optionally be combined with the subject matter of Examples 1-15 to optionally include wherein the effector assembly includes a data and power link in communication with the center of mass determination module, the data and power link configured to provide power and data communication between the force and torque sensor and the center of mass determination module.

Example 17 can include, or can optionally be combined with the subject matter of Examples 1-16 to optionally include wherein the manipulator assembly includes a plurality of effector assemblies selectively coupled with the manipulator arm, each of the effector assemblies including respective force and torque sensors, the respective force and torque sensors of each of the effector assemblies having different force and torque operating ranges.

Example 18 can include, or can optionally be combined with the subject matter of Examples 1-17 to optionally include wherein the manipulation element is configured to move the work piece between first and second pieces of equipment in one or more of an assembly line or a testing line with the manipulator assembly, and the movement between the first and second pieces of equipment includes the at least two different orientations.

Example 19 can include, or can optionally be combined with the subject matter of Examples 1-18 to optionally include a data and power link in communication with the work piece and the center of mass determination module, the data and power link is configured to operate at least a portion of work piece.

Example 20 can include, or can optionally be combined with the subject matter of Examples 1-19 to optionally include wherein the center of mass determination module is configured to reconfigure the work piece into a second configuration with a work piece second center of mass different from the work piece center of mass, and the identification module is configured to identify the work piece second center of mass according to force and torque measurements conducted with the work piece at the at least two different orientations and in the second configuration.

Example 21 can include, or can optionally be combined with the subject matter of Examples 1-20 to optionally include an effector assembly to identify a work piece center of mass, effector assembly comprising: a manipulator interface configured to couple with a manipulator arm, the manipulator interface includes: a mechanical latch configured to interfit with the manipulator arm, and a data and power link; a work piece interface coupled with the manipulator interface, the work piece interface includes a second mechanical latch configured to interfit with the work piece and statically couple the work piece to the work piece interface; and a force and torque sensor between the manipulator interface and the work piece interface, the force and torque sensor configured to measure force and torque between the manipulator and work piece interfaces.

Example 22 can include, or can optionally be combined with the subject matter of Examples 1-21 to optionally include wherein one or more of the mechanical latch and the second mechanical latch include a plurality of pneumatic operated fasteners, the plurality of pneumatic operated latches includes: at least one effector pneumatic port configured for communication with at least one manipulator arm pneumatic port, and one or more latch bearings configured for pneumatic operation through the at least one effector pneumatic port.

Example 23 can include, or can optionally be combined with the subject matter of Examples 1-22 to optionally include wherein the manipulator interface includes a latch collar extending around an arm reception socket, the latch collar includes the mechanical latch.

Example 24 can include, or can optionally be combined with the subject matter of Examples 1-23 to optionally include wherein the data and power link and the at least one pneumatic port are coupled with the latch collar.

Example 25 can include, or can optionally be combined with the subject matter of Examples 1-24 to optionally include wherein the work piece interface includes a second data and power link configured for communication with the work piece, and the second data and power link automatically interfaces with the work piece with interfitting of the work piece by the second mechanical latch.

Example 26 can include, or can optionally be combined with the subject matter of Examples 1-25 to optionally include wherein the data and power link automatically interfaces the force and torque sensor with the manipulator arm with interfitting of the mechanical latch with the manipulator arm.

Example 27 can include, or can optionally be combined with the subject matter of Examples 1-26 to optionally include the manipulator arm.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for automatically identifying a work piece center of mass comprising:
   coupling a work piece to a manipulator assembly, the manipulator assembly includes a force and torque sensor configured to measure force and torque transmitted from the work piece to the manipulator assembly;
   positioning the work piece in at least two different orientations relative to a gravity vector with the manipulator assembly; the at least two different orientations include at least first and second orientations, wherein
      in the first orientation the force and torque sensor measures a first torque and at least a first force associated with the work piece in the first orientation; and
      in the second orientation the force and torque sensor measures a second torque associated with the work piece in the second orientation; and
   identifying the work piece center of mass according to at least the measured first and second torques and at least the first force.

2. The method of claim 1, wherein the manipulator assembly includes a manipulator arm, and
    positioning the work piece in at least two different orientations with the manipulator assembly includes positioning the work piece with the manipulator arm.

3. The method of claim 2 comprising coupling an effector assembly including the force and torque sensor with the manipulator arm, and wherein coupling the work piece to the manipulator assembly includes coupling the effector assembly with the work piece.

4. The method of claim 1, wherein positioning the work piece in at least two different orientations includes positioning the work piece in three or more different orientations, the three or more different orientations including the first and second orientations and a third orientation,
    in the third orientation the force and torque sensor measures a third torque associated with the work piece in the third orientation, and
    identifying the work piece center of mass includes identifying the work piece center of mass according to at least the measured first, second and third torques and at least the first force.

5. The method of claim 1, wherein positioning the work piece in at least two different orientations is included with moving the work piece between first and second pieces of equipment in one or more of an assembly line or a testing line with the manipulator assembly.

6. The method of claim 1 comprising reconfiguring the work piece into a second configuration with a work piece second center of mass, and
    repeating positioning of the work piece in at least two different orientations with the work piece in the second configuration to measure first and second updated torques and at least one updated force, and
    identifying the work piece second center of mass according to least the measured first and second updated torques and the at least one updated force.

7. The method of claim 1, wherein positioning the work piece in at least two different orientations includes positioning relative to first, second and third axes:
    positioning the work piece in the first orientation with a zero moment around the first axis to align the work piece center of mass with one of the second or third axes; and
    positioning the work piece in the second orientation with a zero moment around the second axis to align the work piece center of mass with one of the first or third axes different from the second axis.

8. The method of claim 7, wherein in the first orientation measuring the first torque and at least the first force includes:
    measuring a weight with the force and torque sensor,
    measuring the first torque around one of the third or second axes unaligned with the work piece center of mass, and
    wherein in the second orientation measuring the second torque includes measuring the second torque around one of the third or first axes unaligned with the work piece center of mass.

9. The method of claim 8, wherein identifying the work piece center of mass includes:
    determining a first location of the work piece center of mass along the first axis based on the measured first torque and the measured weight,
    determining a second location of the work piece center of mass along the second axis based on the measured second torque and the measured weight, and
    indexing the work piece center of mass according to the determined first and second locations.

10. The method of claim 1, wherein in the second orientation the force and torque sensor measures the second torque and a second force, and
    identifying the work piece center of mass according to at least the measured first and second torques and at least the first force includes identifying the work piece center of mass according to at least the measured first and second torques and at least the first and second forces.

11. A system configured for manipulation of a work piece and determination of a work piece center of mass comprising:
    a manipulator assembly, the manipulator assembly including a work piece interface configured to grasp and hold a work piece while the manipulator assembly moves the work piece into at least two different orientations;
    a force and torque sensor coupled with the manipulator assembly, the force and torque sensor configured to measure force and torque transmitted from the work piece to the manipulator assembly; and
    a center of mass determination module in communication with the manipulator assembly and the force and torque sensor, the center of mass determination module includes:
        a manipulation element, the manipulation element configured to move the manipulator assembly and the work piece into the at least two different orientations relative to a gravity vector,
        a force and torque measurement element configured to measure the force and torque of the work piece at each of the at least two different orientations with the force and torque sensors, and
        an identification element in communication with the force and torque measurement element, the identification element configured to identify the work piece center of mass according to force and torque measurements conducted with the work piece at the at least two different orientations.

12. The system of claim 11, wherein the manipulator assembly includes a manipulator arm.

13. The system of claim 12, wherein the manipulator assembly includes at least one effector assembly configured for coupling with the manipulator arm, and the at least one effector assembly includes the force and torque sensor.

14. The system of claim 13, wherein the effector assembly transitions between at least two effector configurations:
    in a first configuration the manipulator arm is coupled with the effector assembly a manipulator interface of the effector assembly, and
    in a second configuration the effector assembly coupled with the manipulator ami is coupled with the work piece at a work piece interface of the effector assembly with a mechanical latch of the effector assembly.

15. The system of claim 14, wherein the mechanical latch includes pneumatic operated fasteners.

16. The system of claim 13, wherein the effector assembly includes a data and power link in communication with the center of mass determination module, the data and power link configured to provide power and data communication between the force and torque sensor and the center of mass determination module.

17. The system of claim 12, wherein the manipulator assembly includes a plurality of effector assemblies selectively coupled with the manipulator arm, each of the effector assemblies including respective force and torque sensors, the respective force and torque sensors of each of the effector assemblies having different force and torque operating ranges.

18. The system of claim 11, wherein the manipulation element is configured to move the work piece between first and second pieces of equipment in one or more of an assembly line or a testing line with the manipulator assembly, and the movement between the first and second pieces of equipment includes the at least two different orientations.

19. The system of claim 11, comprising a data and power link in communication with the work piece and the center of mass determination module, the data and power link is configured to operate at least a portion of work piece.

20. The system of claim 19, wherein the center of mass determination module is configured to reconfigure the work piece into a second configuration with a work piece second center of mass different from the work piece center of mass, and the identification element is configured to identify the work piece second center of mass according to force and torque measurements conducted with the work piece at the at least two different orientations and in the second configuration.

21. An effector assembly to identify a work piece center of mass, effector assembly comprising:
a manipulator interface configured to couple with a manipulator arm, the manipulator interface includes:
a mechanical latch configured to interfit with the manipulator arm, and
a data and power link;
a work piece interface coupled with the manipulator interface, the work piece interface includes a second mechanical latch configured to interfit with the work piece and statically couple the work piece to the work piece interface; and a force and torque sensor between the manipulator interface and the work piece interface, the force and torque sensor configured to measure force and torque between the manipulator and work piece interfaces.

22. The effector assembly of claim 21, wherein one or more of the mechanical latch and the second mechanical latch include a plurality of pneumatic operated fasteners, the plurality of pneumatic operated latches includes:
at least one effector pneumatic port configured for communication with at least one manipulator arm pneumatic port, and
one or more latch bearings configured for pneumatic operation through the at least one effector pneumatic port.

23. The effector assembly of claim 22, wherein the manipulator interface includes a latch collar extending around an arm reception socket, the latch collar includes the mechanical latch.

24. The effector assembly of claim 23, wherein the data and power link and the at least one pneumatic port are coupled with the latch collar.

25. The effector assembly of claim 21, wherein the work piece interface includes a second data and power link configured for communication with the work piece, and the second data and power link automatically interfaces with the work piece with interfitting of the work piece by the second mechanical latch.

26. The effector assembly of claim 21, wherein the data and power link automatically interfaces the force and torque sensor with the manipulator arm with interfitting of the mechanical latch with the manipulator arm.

27. The effector assembly of claim 21 comprising the manipulator arm.

* * * * *

UNITED STATES PATENT AND TRADEMARK OFFICE
CERTIFICATE OF CORRECTION

PATENT NO. : 9,897,507 B2
APPLICATION NO. : 14/689125
DATED : February 20, 2018
INVENTOR(S) : Anthony R. Vulcano It is certified that error appears in the above-identified patent and that said Letters Patent is hereby corrected as shown below:

In the Specification

In Column 3, Lines 44-45, delete "manipulator system 102." and insert --manipulator assembly 102.-- therefor In Column 4, Line 45, after "work", delete "piecework"

In Column 5, Line 40, after "work", delete "piecework"

In Column 5, Line 45, after "work", delete "piecework"

In Column 11, Line 62, delete "mass detection module 128" and insert --mass determination module 128-- therefor In Column 12, Line 15, delete "210" and insert --204-- therefor In Column 13, Line 3, delete "mass detection module 128" and insert --mass determination module 128-- therefor In Column 14, Lines 8-9, delete "mass detection module 128)" and insert --mass determination module 128)-- therefor In the Claims In Column 20, Line 56, in Claim 1, delete "assembly;" and insert --assembly,-- therefor In Column 20, Lines 60-61, in Claim 1, delete "orientation;" and insert --orientation,-- therefor Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*

In Column 22, Line 50, in Claim 14, delete "assemblya" and insert --assembly at a-- therefor In Column 22, Line 53, in Claim 14, delete "ami" and insert --arm-- therefor